United States Patent [19]
Schuett

[11] Patent Number: 5,406,494
[45] Date of Patent: Apr. 11, 1995

[54] NUMERICAL CONTROL SYSTEM WITH OPERATOR CONTROLLED CUTTING

[75] Inventor: Todd J. Schuett, Mt. Prospect, Ill.

[73] Assignee: Creative Technology Corporation, Arlington Heights, Ill.

[21] Appl. No.: 214,912

[22] Filed: Mar. 17, 1994

[51] Int. Cl.⁶ ............................................... G06F 15/46
[52] U.S. Cl. .............................. 364/474.3; 364/474.28; 318/569
[58] Field of Search ......... 364/474.03, 474.16–474.20, 364/474.22, 474.24, 474.29, 474.28, 474.32, 474.34; 318/567, 568.1, 569, 571, 572

[56] References Cited

U.S. PATENT DOCUMENTS

| | | | |
|---|---|---|---|
| 4,904,914 | 2/1990 | Seki et al. | 318/567 |
| 4,926,311 | 5/1990 | Matsumura et al. | 364/474.22 |
| 4,949,270 | 8/1990 | Shima et al. | 364/474.29 |
| 4,951,217 | 8/1990 | Clack et al. | 364/474.2 |
| 5,033,005 | 7/1991 | Haske | 364/474.29 |
| 5,122,965 | 6/1992 | Nishida et al. | 364/474.24 |
| 5,223,777 | 6/1993 | Werner et al. | 318/569 |

*Primary Examiner*—Roy N. Envall, Jr.
*Assistant Examiner*—Steven R. Garland
*Attorney, Agent, or Firm*—Quarles & Brady

[57] ABSTRACT

A numerical controller permits real-time manual control of the rough cutting of material from a workpiece by a machine tool via a manual input device controlled by a human operator. Overcutting is prevented by repeated recalculation of the intersection of the tool path with the surface limits stored in numeric form within the controller and stopping of the tool at those limits. The manual input device may provide a signal indicating both direction and magnitude with the magnitude controlling the cutting rate of the tool.

5 Claims, 3 Drawing Sheets

NUMERICAL CONTROL SYSTEM WITH OPERATOR CONTROLLED CUTTING

BACKGROUND OF THE INVENTION

The present invention relates to numerical control systems for controlling machine tools and the like, and in particular, to a numerical control system useful for cutting an arbitrary surface with irregular boundaries.

Numerical control systems are computing devices adapted for the real-time controlled machine tools. The numerical controller typically receives a set of coded instructions forming a part program. The instructions of the part program include generally: "positioning instructions" which describe a sequence of tool movements to be performed to create a finished part, and "set-up instructions" which control accessories, such as tool-changers, or which designate certain machine set-up parameters. In the case of a numerical controller operating a vertical milling machine, the "set-up" instructions may specify, for example, the type and radius of the milling tool, the desired rate of feed of the tool through the material being machined, the spindle speed at which the tool is to rotate and other general parameters of the machining operation.

The numerical controller converts the positioning instructions of the part program to electrical signals which control servo or stepper motors attached to the machine tool to move the tool with respect to the workpiece. For complex parts involving many discrete movements of the tool, these positioning instructions comprise a majority of the instructions of the part program.

Normally the machining of a surface will be accomplished in at least two passes: first a rough cut in which material is removed at the maximum feasible rate, and second a finish cut in which only a relatively thin finish allowance of material is removed to reduce vibration and flexure providing a smooth finish and accurate final dimension.

For the machining of a surface, such as may comprise part of a metal stamping die, plastic mold or foundry patterns, for example, a mathematical description of the surface will first be generated by a designer using computer aided design ("CAD") techniques, typically stand-alone programs running on a high speed work station. The surface description, most simply, is in the form of a series of coordinates for points spaced at regular intervals over a grid, the coordinates providing position information for each of three Cartesian axes designated "x", "y", and "z". Such a description is termed a "wire frame" model as the connection of each of the points to its neighbors produces a surface having the appearance of a frame formed of wire. Alternatively the surface description may be made at irregularly spaced points along the plane.

A description of the path of the tool during the cutting of the workpiece is required in addition to the description of the surface to be cut. For simple surfaces, for example, a rectangular pocket having a uniform depth, the tool path may be a simple rectangular spiral of decreasing size. Such a spiral provides even tool loading, insures that the entire surface is cut and efficiently uses the machine tool by minimizing time occupied by moving without cutting.

For more complex surfaces and particularly those having irregular boundaries that may include straight and curved line segments or "islands" of uncut material, the most efficient cutting path is not well defined. Simple geometric cutting paths may require substantial movement of the tool through previously cut paths to complete the removal of material. For surfaces where the depth of the material to be cut varies significantly over the surface, and must be removed in several passes, similar problems of inefficient tool motion may arise. This is true even if the surface may be bounded by a simple rectangle.

The speed and feed of the tool, dependant generally on the amount and type of material being removed and the condition of the cutter will also influence the optimal cutting path.

Currently, tool paths may be designated during the design process on a CAD/CAM machine by the CAD or CAM operator. Alternatively, some numerical control devices generate their own tool paths from the surface description based on simple space filling algorithms. Generally, both these approaches produce substantially less than the optimal tool path. Further, the automatically generated tool paths are typically successful only for a limited range of machine shapes.

SUMMARY OF THE INVENTION

The present invention recognizes that a skilled human operator observing and controlling the machining process, on a real-time basis, can in many cases produce a more efficient tool path than can be done with CAD/CAM equipment or automatic path generating algorithms. The operator, by observing the tool as it cuts through the workpiece and by anticipating the cutting process as a whole, may better select a tool path for optimal removal of material.

Specifically, the present invention includes a surface memory for storing a numeric representation of the desired surface to be cut in a workpiece. A manual axis input device manipulated by a human operator, produces at least two axes of control signals corresponding to axes in which a cutter of the controlled machine tool may be positioned. The control signals are received by an intersection calculator which determines a direction vector from the current position of the cutter which intersects the desired surface, or boundary at a destination position. A command output produces position commands that move the cutter along the direction vector but not past the destination position. The invention may include a display of the desired surface and the relative position of the cutter with respect to that surface.

It is thus one object of the invention to permit a skilled human operator to control the cutting of an arbitrary surface in real-time while preventing overcutting and preserving the accuracy inherent in numerical control. The operator, guided by observation of the actual machining process, and in certain cases, an auxiliary display of the desired surface, may effect the rapid cutting of material without risk that the precise final dimensions of the surface may be breached. The invention allows the operator to select the tool path and to modify the tool path as the cutting progresses to respond to a variety of factors.

The manual input device may produce not only direction signals but control signals proportional to the desired relative velocity of the cutter along each direction.

Thus, it is another object of the invention to allow the operator not only to select the tool path but to control the feed rate in light of the operator's direct observation of the cutting process and changes in the cutting process with changes in feed rate.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Description of the Apparatus

Figure 1:
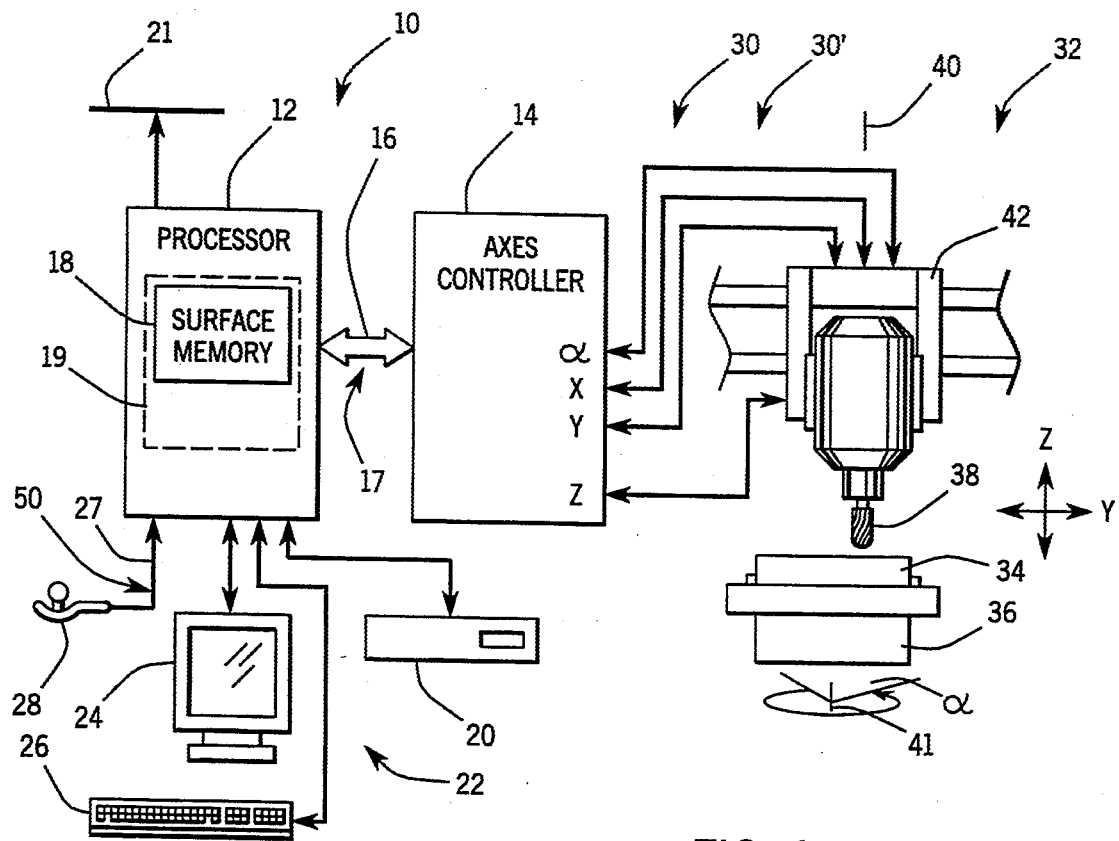
FIG. 1 is a block diagram of the numerical control apparatus for practicing the present invention showing a machine tool having x, y, z and α axes and showing a six dimensional manual input device connected to the processor of the apparatus and a display for output from the processor.

Referring to FIG. 1, a numeric control system 10 of the present invention includes a processor 12 providing position commands 17 to an axis controller 14 via a bi-directional bus 16. The axes controller 14, in turn, provides axis signals 30 to a machine tool 32 and receives position feedback signals 30' to control the position of a cutting tool 38 of the machine tool 32 with respect to the surface in a workpiece 34.

More specifically, the processor 12 executes a part program stored in its memory 19 to generate the position commands 17 transmitted via bus 16 to the axes controller 14. The position commands 17 are generally in the form of coordinates of a destination point in the workpiece 34. The axes controller 14, receiving the position commands 17, compares the destination coordinates of those commands to a current position of the cutting tool 38, and maps a path from the current position of the cutting tool 38 to the desired position. The axis controller 14 then outputs axis signals 30 to the machine tool 32 to provide the necessary motion.

The processor 12 is a general purpose computer including a processing unit (not shown) and memory 19. The memory 19 includes a surface memory portion 18 dedicated to storing the digitized version of the surface to be cut in a form that has been generally described above. The processor 12 communicates with a mass storage device 20, typically a hard disk drive or a network, for loading part programs to the processor 12 and surface data for the surface memory 18. The processor 12 also communicates with a terminal 22 having a display 24 and a keyboard 26 and may be connected to a network 21 for communicating with other systems such as CAD/CAM and CAE terminals.

A three-dimensional manual input device 28, to be described below, is also attached to the processor 12 for the purpose of providing axis control signals 27 to the processor 12 to direct the cutting of the machine tool 32.

The axis controller 14 provides the necessary interface between the axis control signals of the processor 12 and the particular physical actuators (not shown) of the machine tool 32. If the machine tool 32 is actuated by stepper motors, for example, the axis signals 30 from the axis controller 14 will be step commands distributed among the axes and timed so as to produce the desired path, (e.g., a straight line between the present position and the desired position). Such axes controllers 14 are well known in the art and are commercially available under the tradename PMAC (Programmable Motion Axis Control) from the Delta Tau Data Systems Inc. of Canoga Park, Calif., as well as many other companies.

The machine tool 32 to be controlled may have axes along which the tool 38 may be moved without change in angle (translation axes). The machine tool 32 may also include one or more axes about which the axis of the cutting tool 38 is changed in angle (angulation axes).

For clarity, the present invention will be described with respect to a specific machine tool 32, i.e. a bridge mill with a fixed head, as depicted schematically in FIG. 1. It will be apparent from the following description, however, that the invention is equally applicable to other machine tools 32 including other milling machines, lathes and boring machines and therefore this example should not be construed as limiting the invention herein described.

For a bridge mill machine tool 32, three translation axes, termed: x, y and z corresponding to the three Cartesian coordinates, and one angulation axis α are defined. The workpiece 34 is mounted on a table 36. The cutting tool 38 is suspended above the workpiece 34 and rotated for cutting about its axis 40. The cutting tool 38 is also mounted on a pallet 42 which may be moved in the x or y direction generally within a horizontal plane under the control of the x and y axis signals 30 and which may be elevated or lowered according to the z-axis signal 30. Finally, the workpiece 34 may be rotated about an axis 41 generally parallel with the tool axis 40 by an angle α.

Figure 2:
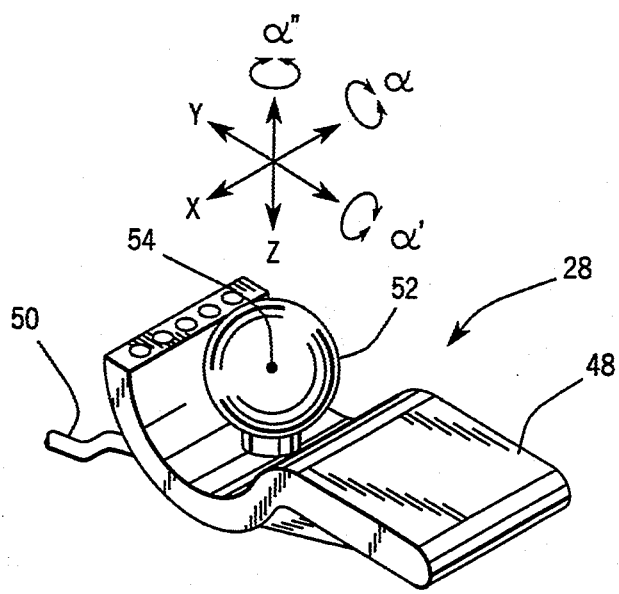
FIG. 2 is a schematic view of the three dimensional manual input device of FIG. 1 showing three orthogonal axes in the x, y and z directions and three rotations about those axes $\alpha$, $\alpha'$ and $\alpha''$ along which force may be applied to provide corresponding control signals to the processor.

Referring now to FIG. 2, the three-dimensional manual input device 28 providing axis control signals 27 to the processor 12 generally includes a sphere 52 sized to be comfortably grasped by a hand of the machine tool operator. The sphere 52 is mounted to a base 48 which may rest on a table or the like and is instrumented to provide measurements of the force exerted on the sphere 52 by an operator's hand along one of six axes centered at the center 54 of the sphere 52: the three Cartesian translative axes x, y, and z, and three rotative axes designated a, a' and a" about each of the Cartesian axes. The sphere 52 does not actually move (except imperceptibly) but the magnitude of the forces applies are converted into the necessary axis control signals 27 and provided to the processor 12 via cable 50. The sensing of the motion of the sphere 52 may be done per conventional methods such as strain gauges well known in the art. Force sensitive, three-dimensional manual input devices are commercially available under the trade name Spaceball ™ 2003, from Spaceball Technologies of Lowell Mass.

When no force is applied to the sphere 52, the sphere 52 is in the home position and no axis control signals 27 are transmitted indicating a static condition. Force along any of the axes described produce axis control signals 27 having a magnitude proportional to the force and a sign dependent on the direction of the force. Thus, negative and positive axis control signals 27 of different magnitudes may be produced for up to six axes of the machine tool 32. As will be described, the magnitude of the deflection may be used to control tool speed up to a predetermined maximum value set by the operator within the limits set by a technician and machine dynamics.

Although the three dimensional manual input device described above is preferred, it will be understood from the following description, that many other similar types of manual input devices may be used in lieu of the Spaceball herein described. For example, a trackball, joystick or mouse in combination with a keyboard can be used provided a suitable number of axis control signals are generated.

Operation of the Invention

Figure 3:
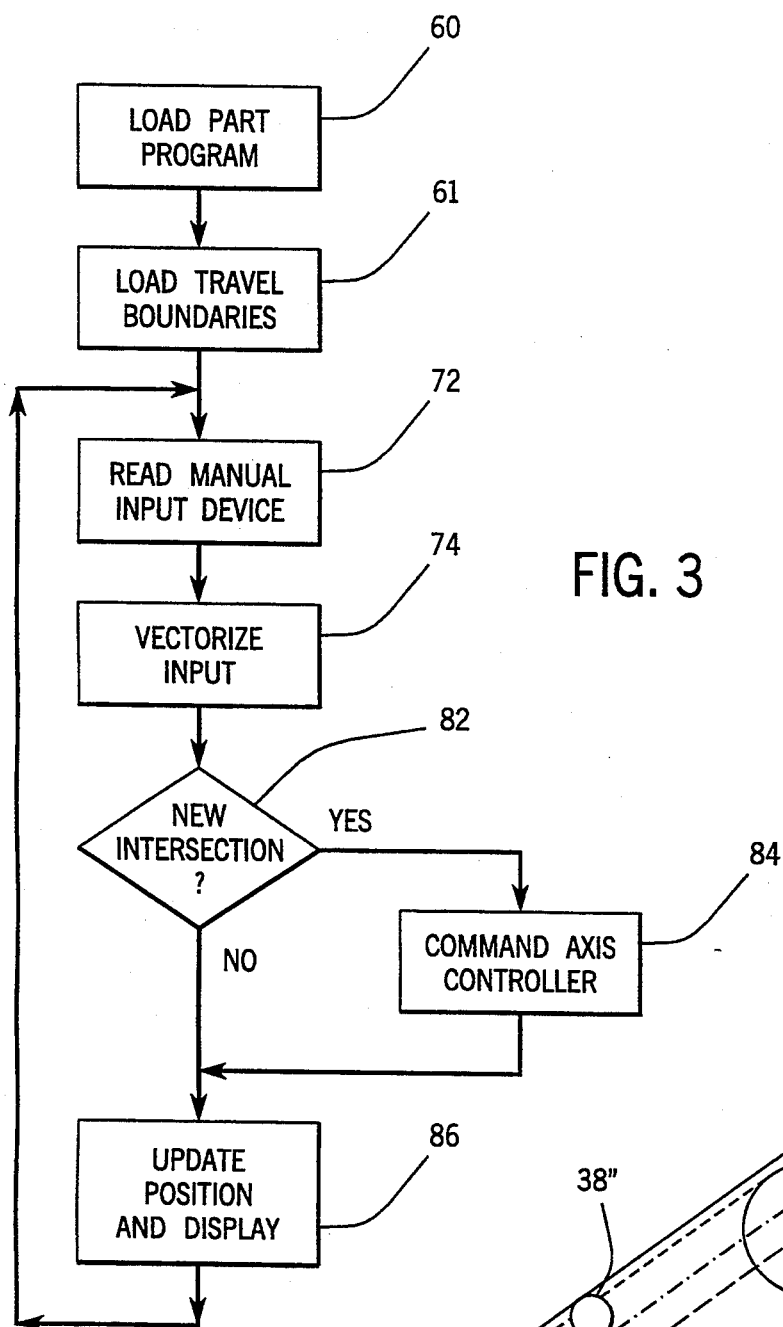
FIG. 3 is a flow chart indicating the steps performed by the processor of the apparatus according to the present invention.

Referring now to FIGS. 1 and 3, the present invention permits real-time control of the machine tool 32 during cutting operations, by the operator via the three-dimensional manual input device 28. The operator's control is limited, by a program running in the processor 12, to remain within bounds provided by a defined surface within the surface memory 18 of the processor 12.

The first step in such control, indicated by process block 60 of FIG. 3, is the loading of a surface description into the memory 19 of processor 12, typically via a network 21 or from the mass storage device 20. The surface description may be part of a part program previously generated on a free standing CAD/CAM system or may be developed by other means.

Figure 4:
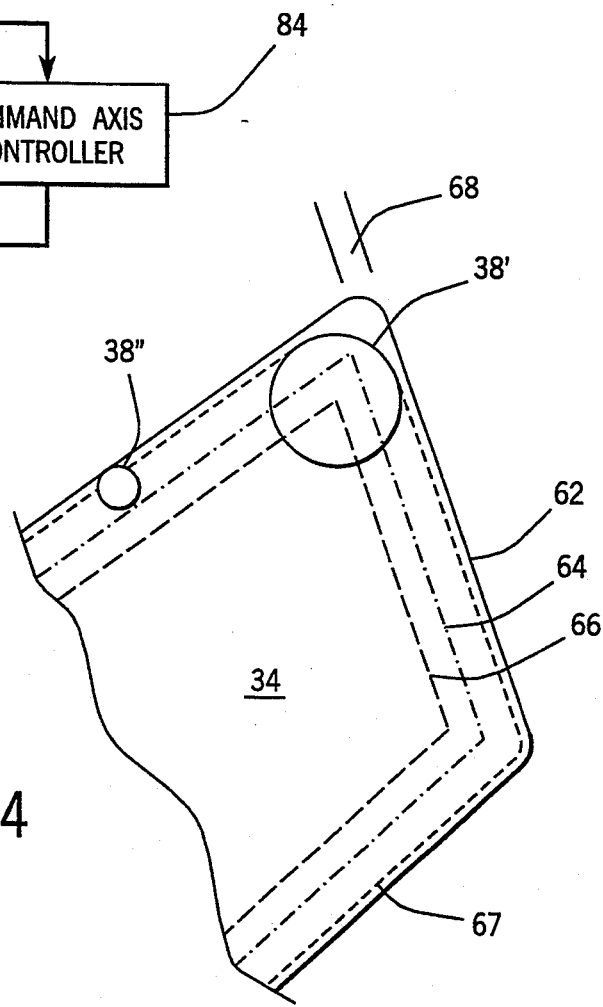
FIG. 4 is a plan view of a pocket cut in a workpiece showing a finish allowance surface, a rough cut surface, and an indicating surface per the present invention.
Figure 5:
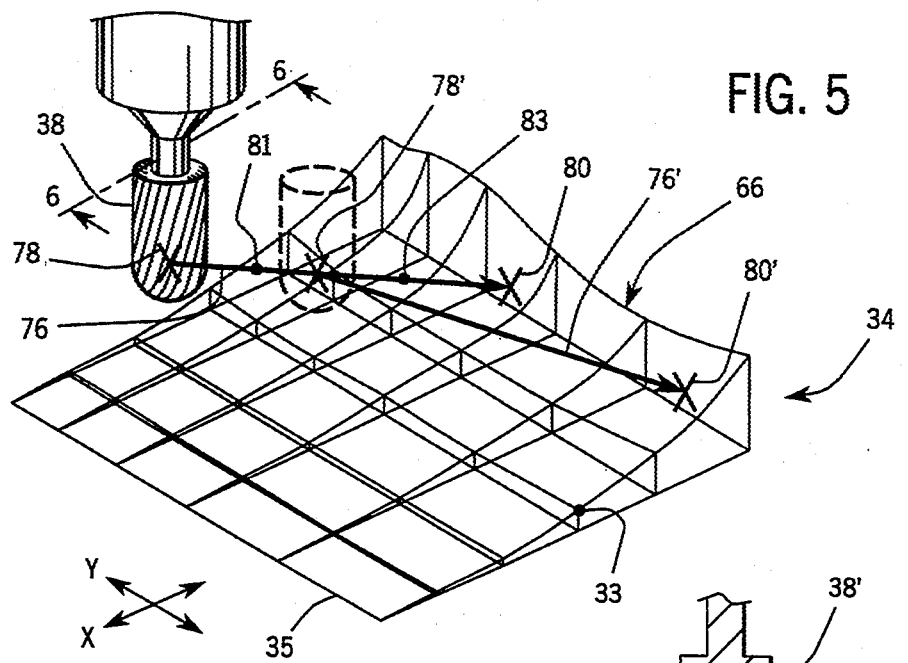
FIG. 5 is a perspective view of a cutting tool with respect to the desired rough cut surface showing calculation of a direction vector and an intersection of the direction vector with the rough cut surface.
Figure 6:
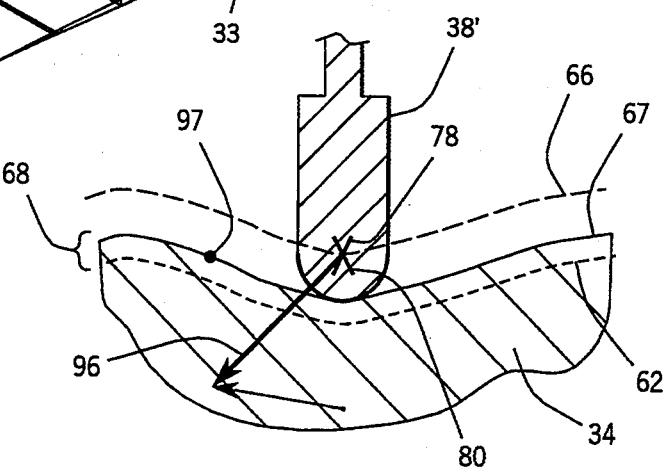
FIG. 6 is an elevational view in cross section of the tool of FIG. 5 along line 6—6 showing the interpretation of the direction vector when it is directed into the rough cut surface and when the tool is positioned at the rough cut surface.

Referring momentarily to FIGS. 4, 5 and 6, the part program includes a surface description that can be used to produce a cutter offset surface 66 being a locus of centerpoints of the tool 38 providing a rough cut surface 67 removed from a finish surface 62 by a finish allowance 68. Note that the offset surface 66 will generally not be a plane but will curve with the finish surface 62. The cutter offset surface 66 is in the form of relative elevations of surface points 33 above a given surface- typically the horizontal or x-y plane of the machine tool. Thus, the surface description is a set of numbers with addresses, the numbers indicating the heights of surface points 33 above the plane and the addresses indicate the coordinates of the point on the plane to which the height is related.

Also provided to the processor 12 is a feed rate to be used by the axes controller 14, and various other set-up parameters such as: spindle speeds, tool radii and type, the finish allowance and the rough cut tolerance values, as will be described.

Typically, the surface description loaded into the surface memory 18 of the processor 12 will be the dimensions of the finished surface 62. Accordingly, this surface description, prior to cutting, must be transformed to provide for cutter compensation as is well known in the art. As used herein, cutter compensation refers to a displacement of the points of the surface to accommodate the finite radius of the cutting tool 38, its geometry and the finish allowance as will be described.

The position of the cutting tool 38 is taken as its center 78. Thus, the offset surface description 66, to be followed by the center of the cutting tool 38, must be displaced from the finished surface 62 by the radius of the tool in order that the cutting tool 38 not cut too deeply. Differences in tool geometry, e.g., flat or round bottom milling cutters, are also taken into account at this time.

A further calculated displacement provides an additional finish allowance 68 of material to remain on the surface to be cut after rough cutting. The finish allowance 68 permits the taking of a second finish cut with a smaller cutting tool 38". The finish cut, by removing less material than the rough cut, promotes less tool vibration and flexure insuring a smoother and more accurate final dimension to the surface. Each of these displacements sum to produce a single cutter offset surface 66.

Referring now to FIG. 4, and in summary, generally the radius of the cutting tool 38' used for the rough cut is substantially greater than the radius of the cutting tool 38" used for the finish cut, the rough cut being intended to remove material as quickly as possible whereas the finish cut is intended to conform most accurately to the tight radiuses of the cut surface. A given finish surface 62 will thus be compensated first to a radius compensation surface 64 displaced inwardly away from the bulk of the workpiece 34 from the finish surface 62 by the radius of the cutting tool 38' and finally to a cutter offset surface 66 displaced further inwardly to provide both for radius offset and for a finish allowance 68 of uncut material to be cut only in a finishing pass. Such compensation techniques are well known in the art.

The compensation of the rough and finish surface contained in surface memory 18 may be done off line prior to the initial cutting of the workpiece 34 or may be done during the cutting of the workpiece 34 according to techniques generally understood in the art. In the present embodiment, the compensation is performed prior to cutting and the surface memory 18 is reloaded with the cutter offset surface 66.

Referring now again to FIG. 3, at process block 61 the operator may input to the processor 12 cutting boundaries defining the outer limits of tool motion for the particular cutting sequence as is understood in the art.

When the surface and part program is loaded and the surface properly compensated per process blocks 60 and 61, and the operator has loaded the tool motion limits, then at process block 72 axis control signals 27, if any, may be received from the three-dimensional manual input device 28. The axis control signals 27 from the three-dimensional manual input device 28 may be interpreted in one of several ways. In the preferred embodiment, the magnitude and sign of the axis control signals 27 are interpreted to represent a desired velocity of the cutting tool 38 with respect to the workpiece 34 up to a maximum feed rate previously loaded into the axes controller 14. The ability to accurately vary the feed rate during the cutting process allows the operator to precisely tailor the feed rate to the observed cutting conditions on a real time basis. By directly observing the cutting process, the operator may evaluate the variety of variables that affect feed rate including: depth of cut, material of the workpiece, tool condition, required finish, and the capabilities of the particular machine tool, and adjust the cutting process based on these variables as tempered by the operator's acquired experience as a machinist.

Referring to FIGS. 3 and 5, at process block 74, the magnitude and sign of the x, y and z axis control signals are converted to individual vectors directed along their respective Cartesian axes and having lengths proportional to their magnitudes. These vectors are summed to produce a direction vector having a particular angle and length in three-dimensional space. The magnitude of this direction vector, if less than the feed-rate previously programmed into the axis controller 14 is used by the axis controller in controlling the feed rate of the cutting tool 38.

A path line 76 equal in angle to this direction vector and beginning at the current position 78 of the cutting tool 38 is then calculated and extended until it intersects cutter offset surface 66 at a destination point 80 or the boundary. Generally, this intersection may be determined by proceeding incrementally along the path line 76 by summing incremental axis values to the coordinates of the present point 78 in proportion to that dictated by the combined direction vector. The incrementally advancing point 81 along path line 76 is projected to the x, y plane (simply by extracting its x and y coordinates) and the four surface points 33 surrounding the point 81 are bi-linearly interpolated to the location of point 81. If the point 81 is below that interpolated value, the cutter offset surface 66 has been penetrated and point 81 may be taken as the destination point 80. If the point 81 is above the interpolated value, additional incrementing is performed until the cutter offset surface 66 is just penetrated and the destination point at the cutter offset surface 66 is determined.

At decision block 82, each destination point 80' is compared with a previous destination point 80, if any, to see if the current axis control signals 27, read at process block 72, have changed since the last reading at process block 72. If so, or if the length of the direction vector has changed, the program branches to process block 84 and the new destination point 80' or a new cutting velocity is output from the processor 12 to the axis controller 14 and the cutting tool 38 begins to move along a path line 76' leading to the new destination point 80' or at the new cutting speed under the control of axes controller 14.

If at decision block 82, the intersection point 80' is not a new destination point, no actions need be taken and the program proceeds to process block 86 being also the next step after block 84 and to be described below. Because the axis controller 14 receives destination points 80, 80', as such, the axis controller 14 will automatically stop tool motion once a destination position 80 or 80' has been reached provided no further instructions have been received. Ideally, the cutter offset surface 66 is computed on an as needed basis on-line between process blocks 82 and 84 when a new intersection is needed.

The tool path so generated may be saved in memory 19 as a sequence of points and used for the cutting of other workpieces per conventional tool path programming.

The present invention contemplates that the operator will have direct sight of the tool 38 and the workpiece 34. Still, even without view of the cutter, no violation of the desired surface is possible. Thus, no supplemental display need be provided to the operator as the surface 67 to be cut is indicated to the operator by the limits of tool motion. Optionally, however, a computer type display may be provided to the operator as implemented by part of process block 86.

Figure 7:
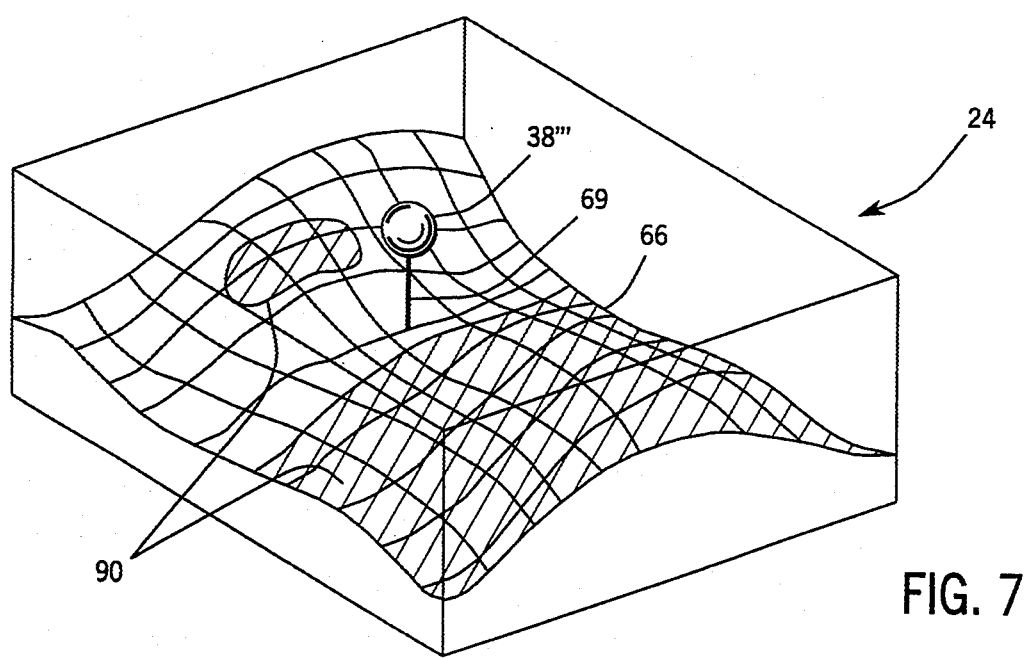
FIG. 7 is a simplified perspective view of the cutting tool in relationship to the desired surface as displayed on the display of FIG. 1.

Referring momentarily to FIG. 1, 3 and 5, at process block 86, a position request message is sent from the processor 12 to the axis controller 14 via bus 16, requesting a current position 78 of the cutting tool 38. This position information is used to update a display 24 and is used as the base position for the vector angle projection for the purpose of recalculating the destination for a process block 74. Referring to FIG. 7, the display 24 may depict the relative location of the cutting tool 38, indicated by a tool symbol 38''', with respect to the cutter offset surface 66, by depicting the latter as a perspective wire frame model. A vertical line 69 extends vertically in the display 24 from the tool symbol 38''' to the cutter offset surface 66 so as to provide a visual indication of the elevation of the cutting tool 38 with respect to the cutter offset surface 66 and an indication of the position of the cutting tool 38 above the x-y plane of the cutter offset surface 66.

The display of the wire frame of the cutter offset surface 66 may be highlighted in areas 90 to visually indicate portions of the surface over which the cutting tool 38 has or has not passed. This highlighting can be done simply by tracking the coordinates of current tool positions 78 and resetting bits in a table as those coordinates are reached.

Thus, the operator can be provided with an additional indication of whether the cutting process has been completed for any particular portion of the cutter offset surface 66.

In all cases, the program next proceeds again to the process block 72 where the three-dimensional manual input device 28 is again read for new axis control signals 27.

The process shown in FIG. 3 is real-time, that is, control by the operator, manifest as control signals from the manual input device 28, must result in nearly instantaneous response by the machine tool 32. This fast response prevents the system from being sluggish or "sloppy" such as would interfere with effective and precise control by the operator. Fast response may be obtained either by polling the manual input device at regular time intervals ("time interrupt") or interrupting the program upon any change in status of the control signals from the manual input device ("status interrupt").

Effective time interrupts may be obtained by repeating the loop of process blocks 72 through 94 so as to constantly read the three-dimensional manual input device 28 and adjust the position of the cutting tool 38 appropriately. It will be noted that the cutting tool 38 need not reach the destination point 80 prior to receiving a new axis control signal 27 from the three-dimensional manual input device 28. When such a new axis control signal is received, indicated by a new destination 80', the cutting tool 38 begins moving toward that new destination 80' from its then current position 78'. Thus, the tool motion is constantly under the control of the operator and the operator need not wait until the completion of any given cutting task.

Alternatively, a status interrupt procedure may be provided by an interrupt driven polling of the three-dimensional manual input device 28 upon any signal from the three-dimensional manual input device 28 indicating a change in control signal from the previous control signal. The interrupt would then trigger the immediate re-vectorization of the axis control signals 27 and recalculation of a new destination 80.

It will be recognized that the steps of FIG. 3 may be implemented as discrete hardware rather than as a computer program according to techniques understood in the art.

Referring now to FIG. 6, when the position of the cutting tool 38, as indicated by its centerpoint 78, equals the current destination point 80, and thus when the cutting tool 38 is at the cutter offset surface 66, the cutting tool 38 will stop, under the control of the axes controller 14. At this point, any additional axis control signals 27 from the three-dimensional manual input device 28 in which the direction vector has any downward z-axis component, such as indicated by direction vector 96, will not permit further motion of the cutting tool 38 because the new destination point for vector 96 remains at point 80 and hence remains at the current position 78 of the cutting tool 38.

Further, in the case where the cutting tool 38 is at a local minimum point along the z-axis, only axis control signals having a positive or upward z-axis component will permit further motion of the cutting tool 38. In another embodiment, the control of the angle α in the present invention may be incorporated into the vectorization of process block 74 by the calculation of a more complex and curved cutter trajectory in place of the path line 76 where the trajectory considers the combined effect of angulation and translation. This vectorization ultimately also produces a destination point 80 which may be used as described above. The calculation of the trajectory, requires that an angular rate must be assumed for the angulation axis, preferably in proportion to the angulation axis control signals 27. Further, a more complex cutter compensation is required. However such an incorporation of angulation into the destination determination is otherwise a straightforward extension of the principles described above.

While this invention has been described with reference to particular embodiments and examples, other modifications and variations will occur to those skilled in the art in view of the above teachings. For example, the manual input device may be used to provide only feed rate information while the cutting tool is guided by a tool path generated by CAD/CAM equipment. This may be desired where the precise tool path is important. Further, the manual input device may be used to control only selected axes with the remaining axes controlled by a predetermined tool path per conventional CAD/CAM practice. Accordingly, the present invention is not limited to the preferred embodiment described herein, but is instead defined in the following claims.

I claim:

1. A controller used to control a machine tool having a cutter that may be positioned in at least two axes in response to position commands so as to cut a desired surface in a workpiece, the controller comprising:
    a surface memory for storing a numeric representation of the desired surface to be cut in the workpiece;
    a manual axis input device producing at least two axis control signals, corresponding to the axes in which the cutter may be positioned, in response to manual activation by a human operator;
    an intersection calculator communicating with the surface memory and the manual axis input device to calculate a direction vector starting at a current position of the cutter and oriented according to the axis control signals to intersect the desired surface at a destination position; and
    a command output communicating with the intersection calculator to produce position commands moving the cutter from the current position along the direction vector but not past the destination position.

2. The controller of claim 1 wherein the cutter is positionable with respect to a workpiece in at least three axes, two of which provide translation of the cutter and one of which provides an angulation of the cutter, and wherein the manual axis input device has a grip that may be manipulated in at least two substantially perpendicular directions to produce two independent axis control signals for the transitive axes rotated about an axis to produce an axis control signals for the angulation axis.

3. The controller of claim 1 wherein the manual axis input device produces control signals proportional to the desired movement of the cutter along the axes.

4. The controller of claim 1 wherein the manual axis input device produces control signals proportional to the desired relative velocity of the cutter along the at least two axes.

5. The controller of claim 1 including in addition a sequence memory for storing the position commands produced in response to the axis control signals so as to provide a roughing template for cutting other workpieces.

* * * * *